Figure 5:
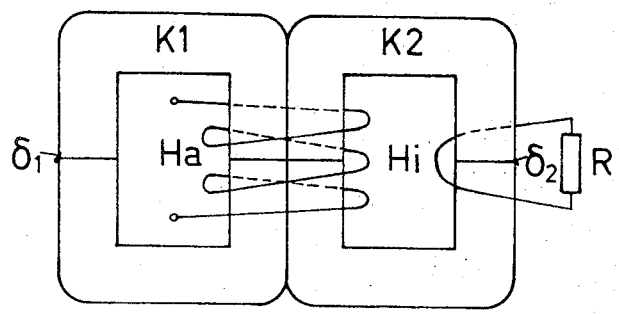

United States Patent [19]
Etter et al.

[11] 3,824,445
[45] July 16, 1974

[54] CHOKE ARRANGEMENT FOR LIMITING SWITCH-IN CURRENT FLOW THROUGH THYRISTOR VALVES OF HIGH-VOLTAGE CONVERTER CIRCUIT

[75] Inventors: Peter Etter, Baden, Switzerland; Jurgen Hengsberger, Berlin, Germany

[73] Assignees: BBC Brown Boveri & Company Limited, Baden, Switzerland; Allgemeine Elektricitacts-Gesellschaft AEG-Telefunken, Berlin and Frankfurt/Main, Germany

[22] Filed: Oct. 18, 1972

[21] Appl. No.: 299,334

[30] Foreign Application Priority Data
Oct. 29, 1971 Switzerland.................. 15791/71

[52] U.S. Cl.................. 321/11, 321/25, 321/27 R, 307/252 L
[51] Int. Cl............................................ H02m 1/18
[58] Field of Search............ 321/25, 27 R, 45 R, 11; 307/252 J, 252 K, 252 L; 317/16

[56] References Cited
UNITED STATES PATENTS
3,601,681  8/1971  Boksjo .......................... 321/11
3,626,271  12/1971  Dewey ........................ 321/27 R X Primary Examiner—Gerald Goldberg
Attorney, Agent, or Firm—Pierce, Scheffler & Parker

[57] ABSTRACT

A high-voltage converter system utilizing a string of series-connected thyristor type valves in which capacity created currents flowing through the thyristors during the switch-in phase of their operating cycle are limited by inclusion of an arrangement of sequentially saturatable core type chokes located in the main load current flow path through the thyristors.

7 Claims, 12 Drawing Figures

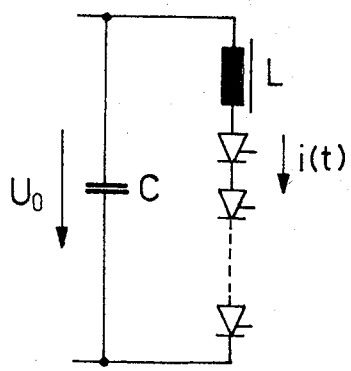
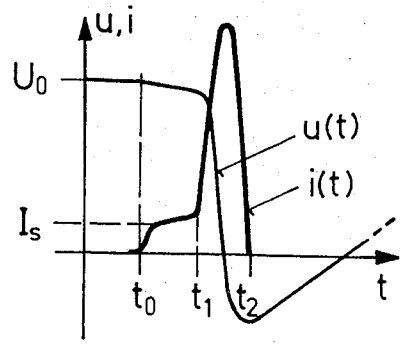
Fig. 1
PRIOR ART
Fig. 2
PRIOR ART
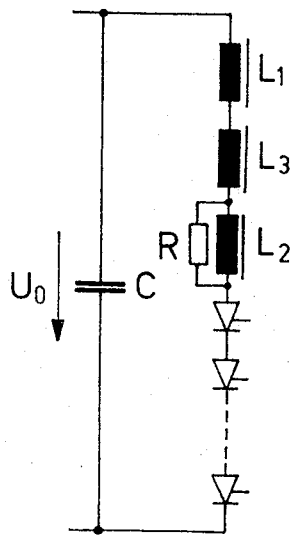
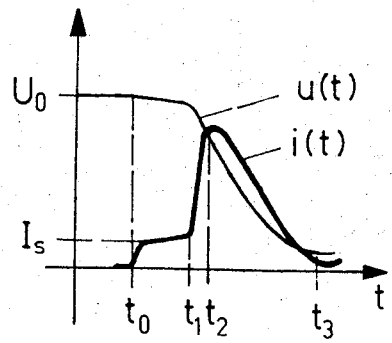
Fig. 3
Fig. 4

CHOKE ARRANGEMENT FOR LIMITING SWITCH-IN CURRENT FLOW THROUGH THYRISTOR VALVES OF HIGH-VOLTAGE CONVERTER CIRCUIT

The present invention relates to a high-voltage conversion system utilizing a string of series-connected thyristor type valves and wherein capacity-created currents flowing through the thyristors during the switch-in phase of their operating cycle are limited by an improved arrangement of sequentially saturatable chokes located in the main load current flow path through the thyristors.

In a high-voltage current conversion system employing a number of series-connected valves of the solid state type such as thyristors, commonly known as SCRs, the valves are subjected to undesirable stresses during the switch-in phase of their operating cycle as a result of high currents flowing therein from harmful capacities electrically in parallel with the valves, i.e. primarily the capacities formed by the current-controlling transformer, as well as the structural capacities of the current-controlling device. Since thyristors possess only a limited current-carrying ability during and shortly after closure of a circuit through the thyristor to carry out its conversion function, these switch-in currents would cause immediate defects in the thyristors unless specific counter-measures are adopted.

In order to keep the discharge of the capacities under control, loading chokes, i.e. iron core reactors which become saturated have been included in the thyristor/main circuit which function, in their initially unsaturated state, as an impedance to prevent the capacitor-related currents from rising to dangerously high levels while offering, after they become saturated, only a comparatively low impedance to the flow of the main load current to be converted by the thyristor.

For purposes of background, FIG. 1 has been included to schematically illustrate a typical series-connected thyristor chain together with the related capacity in parallel with the thyristor chain and a saturable core inductance connected in series with the chain to limit harmful current flow during switch-in; and FIG. 2 is a graph depicting current and voltage changes as a function of time.

With reference to FIG. 1, when the choke L is in the unsaturated state, the source potential $U_o$, i.e. the voltage which rises at the harmful capacity C, is applied primarily at the inductance of the choke. Since, at the present state of the art, the maximum allowable switch-in current of high-power thyristors is approximately 50 ampere, the "stage current" ($I_s$ of FIG. 2) of the choke must not exceed this value initially. Such simple chokes (usually single-turn loops with ferrite core) are widely used in the field of low- and medium-voltage technology.

In the case of very high voltages in combination with large capacities, — conditions which are encountered specifically in connection with high-voltage d.c. transmission systems wherein series connected thyristors function as rectifiers and inverters, an analysis of these specific circumstances shows, that it will be impossible in case of currents of such magnitude (approximately 50 ampere) to discharge the charge of the capacity (C) under controlled conditions; therefore, when the choke has reached its saturation point (instant of time $t_1$ of FIG. 2), the current and voltage values will fluctuate widely, resulting in harmful effects and, in the extreme, in thyristor defects. It follows that the loading must be arranged in such manner that the circuit closing will result in a minimum number of fluctuations, in other words, that the current is sufficiently damped while attaining at the same time a low initial switch-in current.

The principal object of the present invention is to provide an improved choke arrangement that will meet these requirements even in the important, specific case of high source potentials in the presence of great, harmful capacities. This is accomplished by the invention in that the choke arrangement, electrically speaking, comprises three sectional chokes, of which at least two become saturated during operation, that the first saturatable sectional choke is placed within the main current-carrying circuit of the thyristors in series with the load, and a series-parallel combination, formed by the second saturatable sectional choke, the third sectional choke and an impedance which is substantially smaller in order of magnitude in comparison with the impedance of any of the sectional chokes in their unsaturated state with the second saturatable sectional choke being provided with a shunt containing said impedance, and that the sectional chokes are rated in such manner that the first sectional choke will be the first element to become saturated when the switch-in current in the thyristor/main circuit increases, so that the current after the closing of the circuit is first delimited by this first sectional choke and that after it becomes saturated, the current is then fixed by said series/parallel combination which will delimit the gradient $di/dt$ of its rise.

In a further development of the invention, which is particularly advantageous as well as cost- and space-saving, the three sectional chokes in lieu of being structurally individual components, are structurally integrated to form a single combined choke unit, which possesses at the same time transformer characteristics, by uniting two core packages into one sheathed core, its common limb surrounded by the "primary" winding which is located within the thyristor/main circuit and which is rated for the full valve current, so that one of the core packages together with the associated portion of the "primary" winding functions as the first sectional choke, and the second core package with the remaining portion of the "primary" winding functions as second sectional choke, in series with the first sectional choke, and that an outer limb of the entire sheathed core carries an auxiliary winding, terminated by said impedance, so that the impedance in accordance with the known equivalent transformer circuit is coupled with the "primary" winding by way of a leakage inductance, which corresponds to and forms the third sectional choke and which results from the geometry of the winding.

The core package consist preferably of grain-oriented iron tape material.

Figure 6:
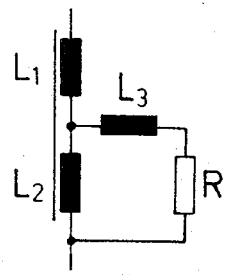
Figure 7:
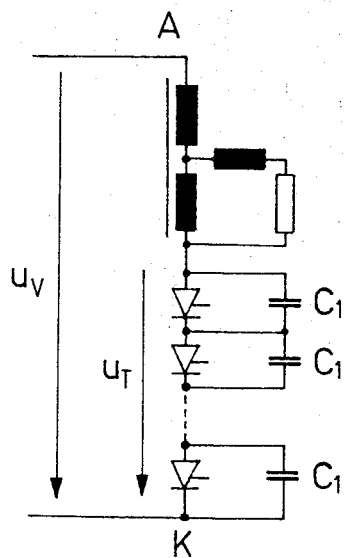
Figure 8:
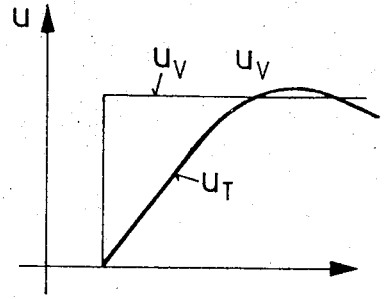
Figure 9:
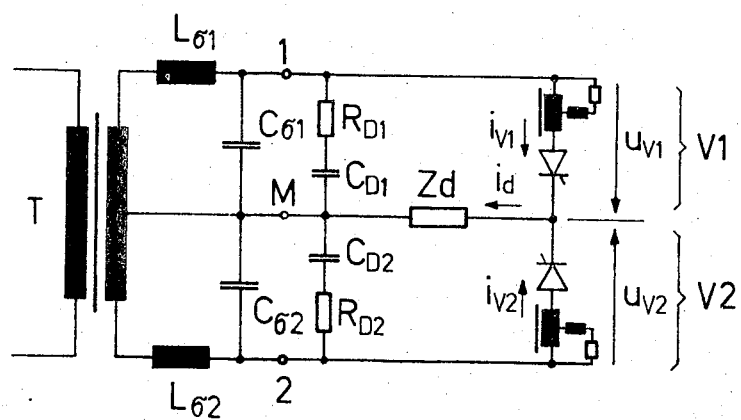
Figure 10:
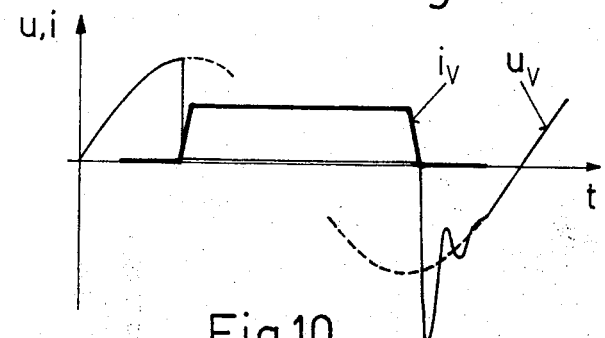

The invention is explained below in detail by use of FIGS. 3 to 11 of the drawings wherein:

FIG. 3 depicts in schematic diagram form one embodiment of the invention utilizing three structurally separate sectional chokes, FIG. 4 shows the corresponding current-voltage time graph, FIG. 5 depicts a combined choke arrangement with sheathed core, FIG. 6 shows the corresponding equivalent circuit, FIG. 7 depicts in schematic diagram form another embodiment utilizing a combined choke, and showing loading capacities across the thyristors, FIG. 8 shows a voltage-time graph in explanation of FIG. 7, FIG. 9 depicts a centerpoint circuit with transformer which serves to explain an additional function of the choke arrangement, and FIGS. 10, 11 show corresponding valve-voltage/time and valve-current/time graphs.

FIG. 4 will be discussed first. Its current-voltage-time graph shows the traces of the switch-in current $i(t)$ and of the decreasing voltage $u(t)$ across the valve (see FIG. 1) in functional relation to time. These current and voltage traces are depicted in the form necessary, based on the known load limits for thyristors in view of switch-in current and $di/dt$ load capacity; therefore, the voltage $u(t)$ must, in contrast to the above discussed FIG. 2, collapse substantially linearly or exponentially without crossover and without "swinging over" into the cut-off range, and the current $i(t)$, upon reaching the point $t_1$ during its spontaneous increase, must still be limited as to amplitude and flank slope ($di/dt$), and upon reaching the maximum, must again have a "overcritical" attenuation and decrease exponentially without crossover, again in contrast to FIG. 2.

Such, almost ideal, trace of a curve can be attained if the loading choke L of FIG. 1 is replaced by three series connected diversely rated, saturatable core sectional chokes $L_1$, $L_2$ and $L_3$ as shown by FIG. 3 and whereby the sectional choke last to become saturated at increasing switch-in current, denoted by $L_2$, is shunted by an impedance, preferably with an ohmic damping resistance R.

$L_1$, to be saturated first, should possess in its unsaturated state an impedance which is large relative to $L_2$ and $L_3$. $L_1$ corresponds substantially to the choke L of FIG. 1, so that the trace of the initial current from the start of the current ($t_0$) up to the saturation of $L_1$ or L respectively is identical in FIGS. 4 and 2: the initial current is limited to the permissible value $I_S$. After the saturation of $L_1$ the current will increase but not so steeply as in case of FIG. 2 where additional chokes are not present. The still unsaturated sectional choke $L_3$, in series with the resistance R, (R should be small in comparison with the resistance of the unsaturated sectional choke $L_2$) delimits in the time interval $t_1 - t_2$ the flank slope $di/dt$ to the permissible value, reducing also the current maximum. After the saturation of $L_3$, and up to the saturation of $L_2$, (point of time $t_2$), there remains only the low resistance R in the main current circuit, and after the saturation of $L_2$, R will also become short-circuited for all practical purposes, with the result that again — as in case of FIG. 1 after saturation of L— there will be present within the main current circuit through the thyristors no other impedance but the load. However, in case of FIGS. 3,4 this moment is substantially delayed due to the "staggered" saturation of the sectional chokes, thus "spanning" the circuit-closing i.e. the switching-in phase which is dangerous in view of the high voltage and the great values of the harmful capacities.

Inspection of the graph shown by FIG. 2 shows that it would be possible in theory to make the time interval $t_0 - t_1$ very long, by designing the choke L in such manner that it will go into saturation at a much later moment of time; the time integral of the current graph $i(t)$, that is $$\int_{t_0}^{t_1} i\,dt$$

is identical with the charge flowing from C within the same period of time $(t_1 - t_0)$. Therefore, a lengthening of this interval, by means of delaying the saturation of L, would enable the major portion of the charge to flow from C, whereby the current would not exceed the value $L_s$, the safe maximum for the thyristors, and whereby the voltage would not be subjected to the occurrence of fluctuations. However, this specific solution is not practical at all because the choke material, so required, would result in power losses and expenditures which are prohibitive. Furthermore, the long staging period would delimit the control of the valve thyristors, which in turn would result in a poor power factor.

The current and voltage traces of FIG. 4, required for a proper and safe functioning of the current control valves, can be accomplished also in a particularly effective and advantageous manner by means of a single, structurally integrated choke arrangement which embodies the functions of three separate sectional chokes, an arrangement which is shown by FIG. 5. It depicts a sheathed core, formed in the case of the preferred species shown, by two abutting core rectangular packages $K_1$ and $K_2$, its common limb surrounded by the "primary" winding $H_a$ which is rated for the full valve current. The core packages consist most suitably of and are wound from, grain-oriented iron band material. One outer limb of the combined core carries an auxiliary winding $H_i$ which is terminated by an impedance R and which need to be rated only for a low effective current value. The impedance R is preferable an ohmic damping resistance. Obviously, a part of the winding $H_a$ and the winding $H_i$ can be regarded as the "primary" and "secondary" winding of a transformer. This is made clear by FIG. 6 which shows that one wound core package ($K_1$) together with the associated portion of the "primary" winding $H_a$ functions as a first sectional choke $L_1$, and the second core package $K_2$ with the remaining portion of the "primary" winding serves as the second sectional choke $L_2$, placed in series with the first sectional choke. The core part $K_2$, at the right of FIG. 5, together with its portion of the "primary" winding $H_a$ and the auxiliary winding $H_i$ also forms a transformer; the damping resistance R is thus coupled with the "primary" winding by way of a leakage inductance $L_3$, resulting from the geometrics of the winding in accordance with the known equivalent transformer circuit. FIG. 6 demonstrates that in the case of the combined choke arrangement, shown by FIG. 5, three "sectional chokes" $L_1$, $L_2$ and $L_3$ are "integrated" to form a single structural unit; $L_1$ and $L_2$ are placed in series, and $L_2$ is provided with a shunt path containing $L_3$ and R connected in series. Obviously, components $L_1$, $L_2$ and $L_3$ can also be designed in the form of individual sectional chokes and connected as shown by FIG. 6. It goes without saying however that the sheathed core arrangement as shown by FIG. 5 is greatly advantageous — also when compared with the species shown by FIG. 3 — as to costs as well as space requirements. The mode of operation is practically identical with the mode of operation in case of the arrangement shown by FIG. 3 — in spite of the slight difference in the circuitwise function of the components $L_1$, $L_2$, $L_3$ and R; therefore the current and voltage traces of FIG. 4 will apply. A potential applied to the combined arrangement will appear initially almost exclusively at $L_1$ because the parallel circuit, formed by $L_2$ and $L_3 + R$ has a substantially lower impedance due to the relatively lesser magnitude of R (see statement above) and of the leakage inductance $L_3$. After saturation of $L_1$ in accordance with its voltage-time-area the voltage will shift automatically to $L_2$, and an increase in current will occur, the increase to be regulated by R. The transition from low to heavy choke current is determined to a great extent by the leakage inductance $L_3$, thus accomplishing the $di/dt$ delimitation.

For the purpose of establishing the desirable current characteristics, use can be made, in addition to varying the number of windings and changing the sectional shapes of the core iron in $K_1$ and $K_2$, of adjustments made possible by providing variant air gaps $\delta_1$ and $\delta_2$ as well as by selection of various sheet-iron gauges and iron qualities for $K_1$ and/or $K_2$.

These adjustment possibilities are important and significant in view of $L_1$ because this inductivity is rated to perform multiple functions. First it is utilized, in addition to the delimitation of the switch-in current, in conjunction with the individual loading capacities $C_1$ of the thyristors (see FIG. 7) for the $du/dt$ delimitation at these thyristors. If, for example, a very steep, positive voltage flank $u_v(t)$ is formed (FIG. 8) at the terminals A and K of the blocked valve, a $du/dt$ flip-flop by the thyristors must be prevented. A proper adjustment of the stage current of the sectional choke $L_1$ in relation to the loading condensers can accomplish a substantial slow-down of the voltage rise at the thyristors as depicted by curve $u_T(t)$ in FIG. 8.

Secondly, $L_1$ in combination with $L_2$ has a very advantageous effect at the time of thyristor cut-out. To facilitate explanation, FIG. 9 depicts a simple centerpoint circuit with the two valve branches $V_1$ and $V_2$ and the (ideal) transformer T. Shown as separate entities are the leakage inductances $L_{\delta 1}$ and $L_{\delta 2}$ of this transformer as well as the stray capacitances $C_{\delta 1}$ and $C_{\delta 2}$ which, to simplify matters, can be assumed to be effective at the transformer terminals 1 – M – 2.

It is a known fact that in the case of a structure of such type, after commutation of the load current $i_d$ from one valve to the other, there will develop at the quenching valve, voltage oscillations in the resonant circuits formed by $L_\delta$ and $C_\delta$, their amplitudes being functionally related to the damping conditions as well as to the shutoff time lag of the thyristors. In the absence of specific damping devices, an overload of the valves voltage-wise up to a factor of 2, or even more, can be expected. FIG. 10 shows in principle the trace of such valve voltage $u_v$ and the corresponding valve current $i_v$.

Figure 11A:
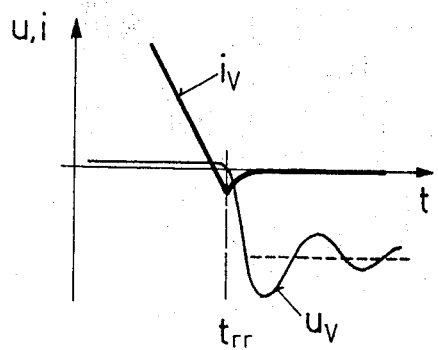
Figure 11B:
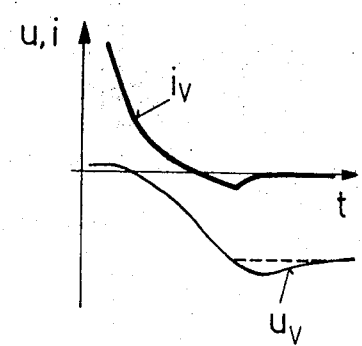

Usually, damping components are employed in order to attenuate such oscillations; in the case of FIG. 9 components $B_{D1}$, $C_{D1}$ and $R_{D2}$, $C_{D2}$ across the transformer terminals represent such means. The use of a choke arrangement as shown by FIG. 5, in series with valves V1 and V2, will have a very substantial damping effect on the commutation oscillations as demonstrated by FIG. 11b which shows the voltage traces at the moment of quenching. FIG. 11a, which depicts conditions without the presence of such choke, shows how the valve voltage at the moment $t_{rr}$ during the breaking-off of the thyristor reverse current rises relatively steeply, and as a result thereof crosses over strongly, while in the case of the choke arrangement, according to FIG. 5, the voltage rise flattens considerably in the vicinity of the crossover point. The negative valve voltage increases relatively slowly with the current being positive, and crosses over only slightly. Furthermore, the storage load carred by the thyristors will be lessened. These results make it feasible to reduce substantially the dimensions and ratings of the additional attenuating components.

We claim:

1. In a high-voltage converter circuit comprising a number of thyristor type valves connected in series with the load the improvement wherein to limit the flow of switch-in current through the thyristors caused by associated capacities, choke means are connected into the thyristor-load circuit, said choke means comprising three choke sections of which at least two are saturable in sequence as the current therethrough increases, the first saturable choke section being connected in series with the thyristor-load circuit and with a series parallel combination formed by said second saturable choke section together with said third choke section and an impedance whose magnitude is substantially smaller in magnitude than that of any of said choke sections in their respective unsaturated states, said second choke section being provided with a shunt path containing said impedance, said choke sections be so structured that said first choke section is the first to reach saturation when the switch-in current within the thyristor-load circuit rises and prior to saturation serves to first limit said current and which is thereafter fixed by said series parallel combination both with respect to its peak value and the steepness of its rise.

2. A high-voltage converter circuit as defined in claim 1 wherein said series parallel combination is formed by connecting said third choke section which is also saturable in series with said second saturable choke section and by connecting said impedance across said second saturable choke section, saturation of said third and second choke sections taking place in that sequence following saturation of said first choke section whereby upon saturation of said first choke section, the rate of rise of said switch-in current is principally limited by the connection in series of said third choke section with said impedance, whereby after saturation of said third choke section takes effect the switch-in current is limited solely by said impedance, and whereby after saturation of said second choke section, the three series-connected choke sections present no significant impedance to the flow of current through the thyristor-load circuit.

3. A high-voltage converter circuit as defined in claim 1 wherein said series parallel combination is formed by connecting said second saturable choke section in parallel with a series connection of said third choke section and said impedance, whereby upon flow of said switch-in current in the thyristor-load circuit and subsequent to saturation of said first choke section, the effective voltage is applied substantially exclusively to said parallel circuit which serves to limit the rate of rise of said switch-in current.

4. A high-voltage converter circuit as defined in claim 3 wherein said first, second and third choke sections are constituted by a structurally combined choke arrangement having the characteristic of a transformer by a union of two rectangular core packages into a sheathed core, the common limb of said core established by adjacent legs of the core packages being surrounded by a primary winding connected into the thyristor-load circuit and which is rated for the full thyristor current, one of said core packages together with an associated part of said primary winding forming said first saturatable choke section, the other of said core packages together with the remaining portion of said primary winding forming said second saturatable choke section which is thereby connected in series with said first saturatable choke section, and an auxiliary winding provided on one of the outer limbs of said sheathed core terminated by said impedance whereby said impedance in accordance with the known equivalent transformer circuit is coupled with said primary winding by way of a leakage inductance which constitutes said third choke section as a result of the geometrics of the winding.

5. A high-voltage converter circuit as defined in claim 4 wherein said core packages are made from grain-oriented iron band material.

6. A high-voltage converter circuit as defined in claim 4 wherein for the purpose of achieving a more precise adjustment of desirable current characteristics, provisions are included for varying the number of turns of the windings on said core as well as the profiles of the core packages, the sizes of air gaps provided in the magnetic circuits of the core packages, and also by selection of the thickness of the iron band material and its qualities.

7. A high-voltage converter circuit as defined in claim 1 wherein said impedance is constituted by an ohmic resistance element.

* * * * *